(No Model.) 2 Sheets—Sheet 1.

A. PIERSON.
CORN PLANTER.

No. 531,966. Patented Jan. 1, 1895.

WITNESSES:
C. V. Thurman.
S. G. Thurman.

INVENTOR
ARTHUR PIERSON
BY
Jno S Thurman
ATTORNEY.

(No Model.) 2 Sheets—Sheet 2.
A. PIERSON.
CORN PLANTER.
No. 531,966. Patented Jan. 1, 1895.
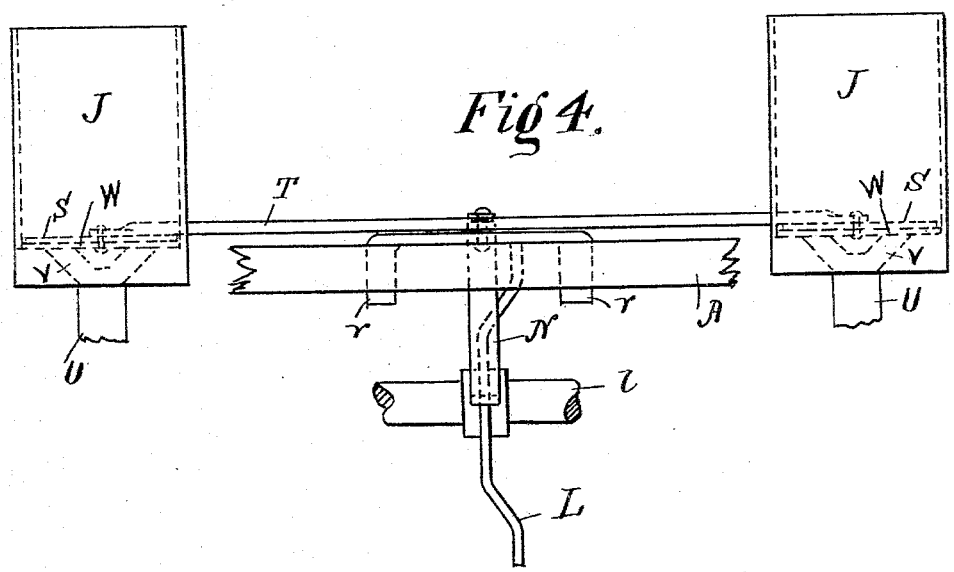
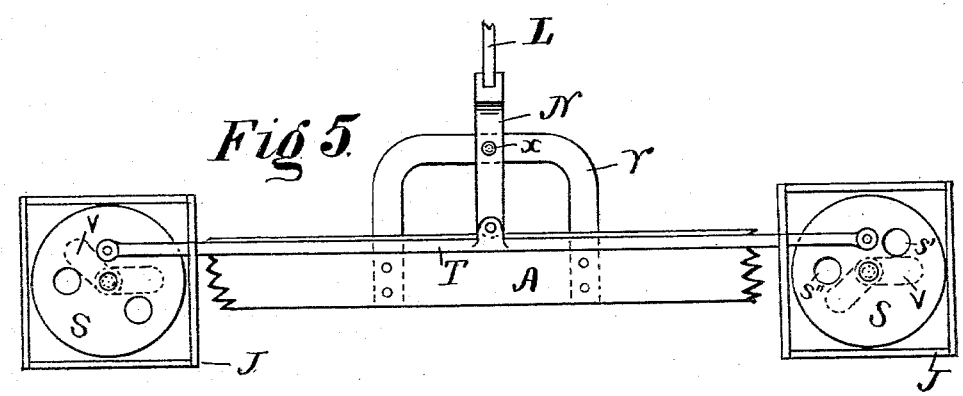
WITNESSES:
C. V. Thurman
S. G. Thurman
INVENTOR
ARTHUR PIERSON,
BY
Jno S Thurman
ATTORNEY.

UNITED STATES PATENT OFFICE.

ARTHUR PIERSON, OF DANVILLE, INDIANA.

CORN-PLANTER.

SPECIFICATION forming part of Letters Patent No. 531,966, dated January 1, 1895.

Application filed March 12, 1894. Serial No. 503,385. (No model.)

*To all whom it may concern:*

Be it known that I, ARTHUR PIERSON, a citizen of the United States, residing at Danville, in the county of Hendricks and State of Indiana, have invented certain new and useful Improvements in Corn-Planters; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in corn planters.

The object of this invention is to simplify the devices of this character, and make them more safe, reliable and convenient in use by means provided to raise the front wheels in turning at the end of the row, and the springs to keep the front wheels stationary when so lifted, and also to arrange the parts of the planter in such manner that it can be easily handled and operated, and which are safe, strong and durable, effective in the desired results and comparatively inexpensive in manufacture.

With these objects in view, the invention consists in certain novel details of construction and arrangement of parts to be hereinafter described and pointed out particularly in the appended claims.

Figure 1:
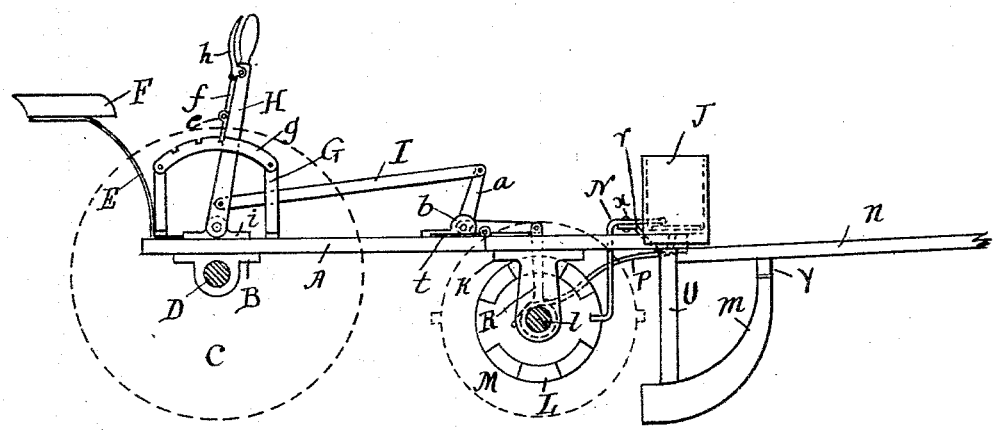
Figure 2:
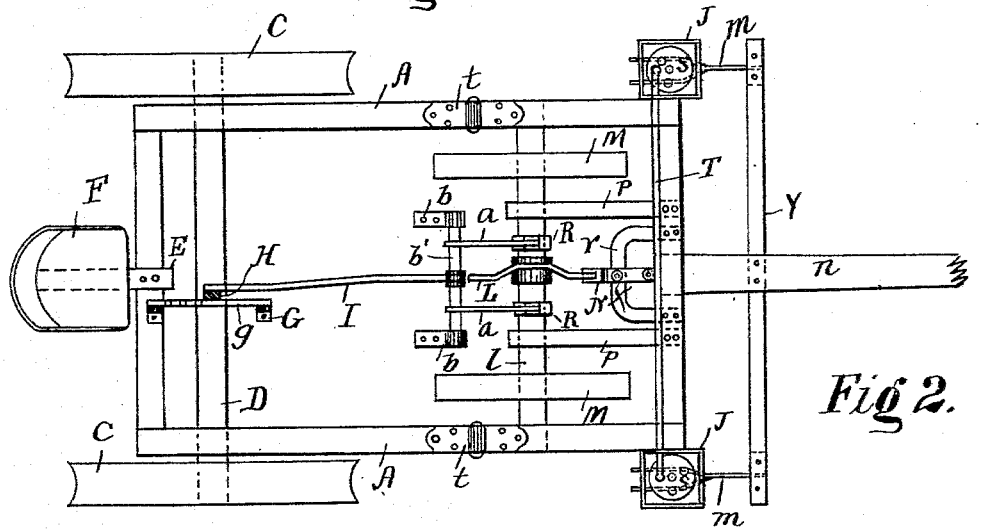
Figure 3:
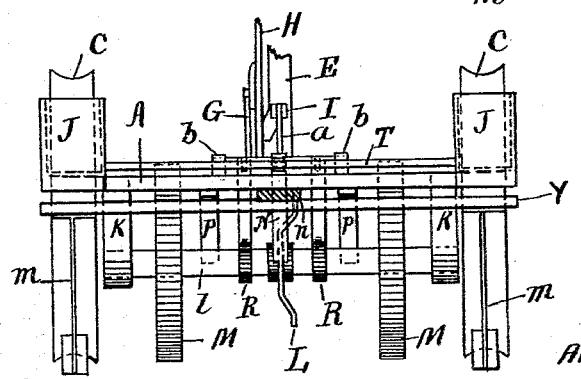

Referring to the drawings, Figure 1 is a side elevation constructed in accordance with my invention. Fig. 2 is a plan view, with the flooring removed. Fig. 3 is a front view with the levers and seat broken away. Fig. 4 is an enlarged view showing the corn operating mechanism, and Fig. 5 is a plan view of Fig. 4.

Similar letters of reference in the several views indicate the same parts.

Like other agricultural implements the present device is adapted to be drawn by animals or other power at the same time remaining under the control of the husbandman, being for these purposes provided with a frame A, to which the tongue $n$ is attached, carrying the main operating parts of the device. The frame A is provided with the rear axle D, which has bearings in the boxes B, which are secured to the main frame. On the end of said axles are the wheels C with the periphery grooved as on ordinary planters of this character.

F, is the seat for the driver.

E, is the seat spring which is secured to the frame A.

$l$, is the front axle and has bearings in the boxes K which are secured to the frame. On the end of said axles are the wheels M. Said wheels are inside of the main frame.

J are the grain boxes and are secured to the frame, and which will be more fully hereinafter described.

The frame A is divided into two sections which are connected by the hinges $t$. The front of the frame is raised or lowered by means of the operating lever H, provided with the handle $h$, latch $e$ and connecting rod $f$.

$g$ is the quadrant which is graduated with notches, and G the quadrant supports.

$i$, is the lever bracket which is bolted to the floor.

I is a rod connected to the lever bracket $a$, which is journaled in bearings $b$.

R, are the straps around the front axle and are connected to the arms $a$.

$p$ are the springs connected to the front end of the frame and extend over the axle $l$ and tend to keep the axle from oscillating or rotating when the frame is elevated. Secured to the axle $l$ is the cam wheel L which operates the bent lever N, which is fulcrumed to the bracket $r$ at $x$.

J, are the corn boxes, and are secured to the main frame.

S, are oscillating disks to feed the grain.

V is the outlet to the chute U, which carries the grain down directly in between the furrow openers $m$.

The oscillating feed disks S are pivoted with a loose rivet to the lower plate W, which is stationary and secured to the bottom of the box J. The holes in plate W, match the holes V, in the bottom of the box. Disk S is operated by the rod T passing through the inner side of the boxes. The rod T is operated by, and connected at the center to the lever N.

In operation, when the holes S' are open to allow the grain to pass through, the holes S" are closed and vice versa.

The runners $m$ which are of the usual kind are connected to the cross beam Y, which is attached to the tongue $n$.

Having thus described my invention, what I claim, and desire to secure by Letters Patent, is—

1. In a corn planter, a main frame A, the rear wheels supporting the same, a front section hinged to said main frame, an axle supported by said front section, wheels carried by said axle within the frame, operating connections between the front axle and the main frame, seed hoppers carried by the front section, a cam on the front axle and connections therefrom to the seed hoppers, substantially as described.

2. In a corn planter, a main frame in two parts hinged together, a front axle, springs bearing on said axle to prevent the same from turning when raised and operating connections for elevating the front part of the frame, substantially as described.

In testimony whereof I affix my signature in presence of two witnesses.

ARTHUR PIERSON.

Witnesses:
JNO. S. THURMAN,
MAUD M. WILSON.